US009206923B2

(12) United States Patent
Jackson (10) Patent No.: US 9,206,923 B2
(45) Date of Patent: Dec. 8, 2015

(54) ROTARY SHAFT SEALS

(71) Applicant: FISHER CONTROLS INTERNATIONAL LLC, Marshalltown, IA (US)

(72) Inventor: Trenton Frank Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 244 days.

(21) Appl. No.: 13/830,434

(22) Filed: Mar. 14, 2013

(65) Prior Publication Data

US 2014/0264121 A1    Sep. 18, 2014

(51) Int. Cl.
| F16K 41/10 | (2006.01) |
| F16K 1/226 | (2006.01) |
| F16K 27/02 | (2006.01) |
| F16J 3/04 | (2006.01) |
| F16J 15/52 | (2006.01) |
| F16L 27/11 | (2006.01) |

(52) U.S. Cl.
CPC .............. *F16K 41/106* (2013.01); *F16K 1/2268* (2013.01); *F16J 3/047* (2013.01); *F16J 15/52* (2013.01); *F16K 27/0218* (2013.01); *F16L 27/11* (2013.01); *Y10T 403/31* (2015.01)

(58) Field of Classification Search
CPC .............. F16J 3/047; F16J 3/048; F16J 15/52; F16K 1/2268; F16K 5/0647; F16K 41/10; F16K 41/106; F16K 41/125; F16K 15/028; Y10T 403/31
See application file for complete search history.

(56) References Cited

U.S. PATENT DOCUMENTS

| 2,867,242 | A | | 1/1959 | Harris et al. |
| 3,082,795 | A | | 3/1963 | Heller |
| 3,318,335 | A | | 5/1967 | Heller |
| 4,125,130 | A | * | 11/1978 | Yamamoto .................... 138/121 |
| 5,050,894 | A | | 9/1991 | Merel et al. |
| 6,796,563 | B2 | * | 9/2004 | Ruebsamen et al. .......... 277/636 |
| 6,937,316 | B2 | * | 8/2005 | Kemper et al. ................. 355/30 |
| 2014/0034858 | A1 | * | 2/2014 | Jackson ........................ 251/296 |
| 2014/0339452 | A1 | * | 11/2014 | Weis ............................. 251/308 |

FOREIGN PATENT DOCUMENTS

| DE | 10307471 | 11/2004 |
| FR | 2641838 | 7/1990 |

OTHER PUBLICATIONS

International Searching Authority, "The Written Opinion of the International Searching Authority," issued in connection with corresponding International Patent Application No. PCT/US2014/022248, mailed Jun. 3, 2014 (6 pages).

International Searching Authority, "The International Search Report," issued in connection with corresponding International Patent Application No. PCT/US2014/022248, mailed Jun. 3, 2014 (3 pages).

* cited by examiner

*Primary Examiner* — Matthew W Jellett
(74) *Attorney, Agent, or Firm* — Hanley, Flight & Zimmerman, LLC (57) ABSTRACT

Rotary shaft seals are disclosed herein. An example apparatus includes a valve body and a shaft extending into the valve body. The shaft is to rotate relative to the valve body. The example apparatus also includes a seal. The seal is disposed outside of the valve body and fixedly coupled to the valve body and the shaft to provide a fluid seal between the shaft and a cavity within the valve body.

14 Claims, 7 Drawing Sheets

ROTARY SHAFT SEALS

FIELD OF THE DISCLOSURE

This disclosure relates generally to seals and, more particularly, to rotary shaft seals.

BACKGROUND

Rotary control valves (e.g., butterfly valves, ball valves, etc.) are often used in industrial processes such as, for example, oil and gas pipeline distribution systems and chemical processing plants to control flow of process fluids. Generally, a valve shaft extends from a flow control member (e.g., a disk, a ball, etc.) through a valve body to an actuator, which controls movement and/or a position of the flow control member. To reduce emissions of the process control fluid, packing (e.g., polytetrafluoroethylene (PTFE) packing) is generally disposed in an aperture between the valve shaft and the valve body.

SUMMARY

Rotary shaft seals are disclosed herein. An example apparatus includes a valve body and a shaft extending into the valve body. The shaft is to rotate relative to the valve body. The example apparatus also includes a seal. The seal is disposed outside of the valve body and fixedly coupled to the valve body and the shaft to provide a fluid seal between the shaft and a cavity within the valve body.

Another example apparatus disclosed herein includes a sleeve having a corrugated portion. The sleeve is to be coupled to a valve body and a shaft extending into the valve body to provide a fluid seal between the shaft and an inner portion of the valve body. The corrugated portion is to enable the sleeve to elastically deform about an axis of rotation of the shaft when the shaft rotates relative to the valve body.

Another example apparatus disclosed herein includes a seal through which a rotary shaft is to extend. A first end of the seal is to rotate with the shaft and relative to a second end of the seal. Rotation of the shaft is to twist a first portion of the seal and compress or expand a second portion of the seal.

The features, functions and advantages that have been discussed can be achieved independently in various examples or may be combined in yet other examples further details of which can be seen with reference to the following description and drawings.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Rotary shaft seals are disclosed herein. While the following examples are described in conjunction with rotary valves, the example seals and/or the example sleeves disclosed herein may be used in conjunction with any type of device having a rotary shaft.

An example seal may include a first corrugated portion. In some examples, the first corrugated portion includes a plurality of folds running along a length of the seal. The seal may surround a portion of a rotary shaft such as, for example, a shaft of a rotary control valve. In some examples, a first end of the seal is coupled to the shaft, and a second end of the seal is coupled to a body such as, for example, a valve body. The seal provides a fluid seal between the shaft and an inner portion (e.g., a fluid flow passageway) of the body. When the shaft rotates, the first end of the seal is to rotate with the shaft while the second end may remain fixed to the body. In some examples, the folds of the first corrugated portion enable the seal to be flexible (e.g., elastically deform) and, thus, twist when the first end of the seal rotates relative to the second end of the seal.

In some examples, the seal includes a second corrugated portion. The second corrugated portion may include one or more folds running around the seal (e.g., around a circumference of the seal). In some examples, when the first corrugated portion twists, a first length of the first corrugated portion increases or decreases. If the first length increases, the first corrugated portion may compress the second corrugated portion. If the first length decreases, the first corrugated portion may expand the second corrugated portion. Thus, the seal may substantially maintain a given length when the first corrugated portion twists as a result of rotation of the shaft.

Figure 1:
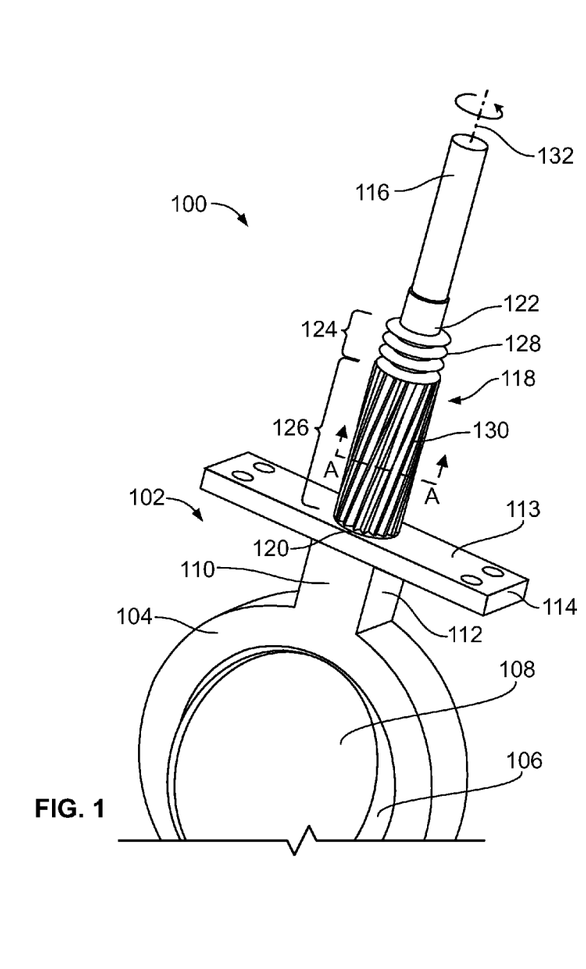
FIG. 1 illustrates an example rotary valve assembly disclosed herein.

FIG. 1 illustrates an example rotary valve assembly 100 disclosed herein. In the illustrated example, the rotary valve assembly 100 includes a rotary valve 102. The example rotary valve 102 of FIG. 1 is a butterfly valve. However, any type of rotary valve may be employed in place of the example rotary valve 102 in accordance with the teachings of this disclosure. In the illustrated example, the rotary valve 102 includes a valve body 104 defining a cavity 106 (e.g., a fluid flow passageway). A flow control member 108 is disposed in the cavity 106. In the illustrated example, the flow control member 108 is a disk. In other examples, the flow control member 108 is a ball, a plug, and/or any other suitable type of flow control member. In the illustrated example, the valve body 104 defines a bonnet 110. The example bonnet 110 includes a neck 112 and a flange 114. In the illustrated example, a shaft 116 extends into the rotary valve 102 via an aperture 201 (FIG. 2) defined by the bonnet 110 of the valve body 104. The example shaft 116 of FIG. 1 is coupled to the flow control member 108. The shaft 116 may also be coupled to an actuator. In some examples, the actuator is coupled to the rotary valve 102 via the flange 114. Other example rotary valve assemblies employ rotary valves having valve bodies without a bonnet.

In the illustrated example, a sleeve 118 provides a fluid seal between the shaft 116 and an inner portion (e.g., the cavity 106, the aperture defined by the bonnet 110, etc.) of the valve body 104. Thus, the example sleeve 118 is a seal. In the illustrated example, the sleeve 118 is disposed outside of the valve body 104 and surrounds a portion of the shaft 116 disposed outside of the valve body 104. The example sleeve 118 has a first end 120 and a second end 122. The first end 120 of the sleeve 118 is fixedly coupled (e.g., welded, etc.) to an exterior surface 113 of the valve body 104. In the illustrated example, the first end 120 of the sleeve 118 is coupled to the flange 114 such that the sleeve 118 forms a fluid seal between the sleeve 118 and the flange 114 that surrounds the shaft 116 and the aperture 201 of the valve body 104. The second end 122 of the sleeve 118 is fixedly coupled (e.g., welded, etc.) to the shaft 116. In the illustrated example, the sleeve 118 is coupled to the shaft 116 such that the sleeve 118 provides a fluid seal surrounding the shaft 116 (e.g., about a circumference of the shaft 116). Thus, the example sleeve 118 provides a fluid seal at the first end 120 and the second end 122 of the sleeve 118. As a result, during operation of the example rotary valve 102, process fluids (e.g., liquids, gases, etc.) may substantially fill and/or flow into the aperture and a space (FIG. 2) between the shaft 116 and the example sleeve 118, and the example sleeve 118 prevents the process fluids from emitting into an ambient environment surrounding the rotary valve 102 via the aperture through which the shaft 116 extends through the valve body 104. Thus, the sleeve 118 does not permit any fugitive emissions via the rotary valve 102.

The example sleeve 118 of FIG. 1 includes a linear portion 124 and a rotary portion 126. The example linear portion 124 is corrugated. In the illustrated example, the linear portion 124 includes a plurality of lateral folds 128 (e.g., bellows, ridges, creases, furrows, bends, wrinkles, etc.). In the illustrated example, the lateral folds 128 run around the shaft 116 (e.g., about a circumference of the shaft 116). In some examples, the lateral folds 128 are substantially perpendicular to a longitudinal axis of the shaft 116. In other examples, the lateral folds 128 substantially form a spiral pattern along the linear portion 124. In the illustrated example, the linear portion 124 includes four lateral folds 128. Other examples include other numbers of lateral folds. In the illustrated example, the linear portion 124 is adjacent and/or defines the second end 122 of the sleeve 118. In other examples, the linear portion 124 may be adjacent the flange 114, disposed on a central portion of the sleeve 118 (e.g., spaced apart from the first end 120 and the second end 122), and/or at any other suitable position along the sleeve 118.

The example rotary portion 126 of FIG. 1 is corrugated. In the illustrated example, the rotary portion 126 includes a plurality of longitudinal folds 130 (e.g., bellows, ridges, creases, furrows, bends, wrinkles, etc.). The example longitudinal folds 130 run along a length of the rotary portion 126. The example rotary portion 126 may employ any suitable number of longitudinal folds 130. The example rotary portion 126 is adjacent and/or defines the first end 120. In other examples, the rotary portion 126 may be adjacent the second end 122 of the sleeve 118, disposed on a central portion of the sleeve 118, and/or disposed at any other position along the sleeve 118.

While the example sleeve 118 of FIG. 1 includes one linear portion (e.g., the linear portion 124), other examples (e.g., the examples of FIGS. 8 and 9) include more than one (e.g., 2, 3, 4, etc.) linear portion. Some or all of the linear portions may have the same number of lateral folds 128 or different numbers of lateral folds 128. The linear portions may be adjacent each other, interposed between one or more rotary portion, and/or in any other arrangement. In some examples, the linear portions are the same size (e.g., length, width, and/or wall thickness, etc.). In other examples, the linear portions are different sizes. Other examples do not include any linear portions.

Some examples include more than one (e.g., 2, 3, 4, etc.) rotary portion. The rotary portions may be interposed between one or more linear portions. In some examples, some or all of the rotary portions are the same size (e.g., length, width, and/or wall thickness, etc.). In other examples, some or all of the rotary portions are different sizes. Some or all of the rotary portions may have the same number of longitudinal folds or different numbers of longitudinal folds.

During operation of the example rotary valve 102, the shaft 116 may be rotated (e.g., via an actuator) relative to the valve body 104 about an axis of rotation 132 to control a position of the flow control member 108 and, thus, the flow of the process fluids. When the example shaft 116 rotates, the sleeve 118 elastically deforms to enable the second end 122 of the sleeve 118 to rotate with the shaft 116 while the first end 120 remains fixed to the bonnet 110. Thus, the example sleeve 118 is flexible. In the illustrated example, when the second end 122 rotates with the shaft 116, the rotary portion 126 of the sleeve 118 twists about the axis of rotation 132 of the shaft (e.g., some or all of the longitudinal folds 130 bend to enable the rotary portion 126 to twist). As a result, a length of the rotary portion 126 increases or decreases (i.e., the example rotary portion 126 extends or contracts substantially parallel to the axis of rotation 132 of the shaft 116). If the length of the rotary portion 126 increases, the rotary portion 126 elastically deforms the linear portion 124 (e.g., the lateral folds 128 of the linear portion 124 compress), and a length of the linear portion 124 decreases. If the length of the rotary portion 126 decreases, the rotary portion 126 pulls the linear portion 124 and elastically deforms the linear portion 124 (e.g., the lateral folds 128 of the linear portion 124 expand), and the length of the linear portion 124 increases. Thus, although the length of the linear portion 124 and the length of the rotary portion 126 may change during operation as the shaft 116 rotates, a length of the sleeve 118 remains substantially constant.

The example sleeve 118 may be any suitable flexible material. For example, the sleeve 118 may be composed of one or more elastic materials and/or materials that exhibit elastic behavior under stress (e.g., plastic, rubber, metal, etc.). In some examples, the sleeve 118 is operated within an elastic range of one or more materials of the sleeve 118 (i.e., the sleeve 118 is subjected to stresses below a yield strength of one or more of the materials of the sleeve 118 during operation of the example rotary valve 102). In some examples, the linear portion 124 is composed of different material than the rotary portion 126. In other examples, the linear portion 124 and the rotary portion 126 are the same material.

Figure 2:
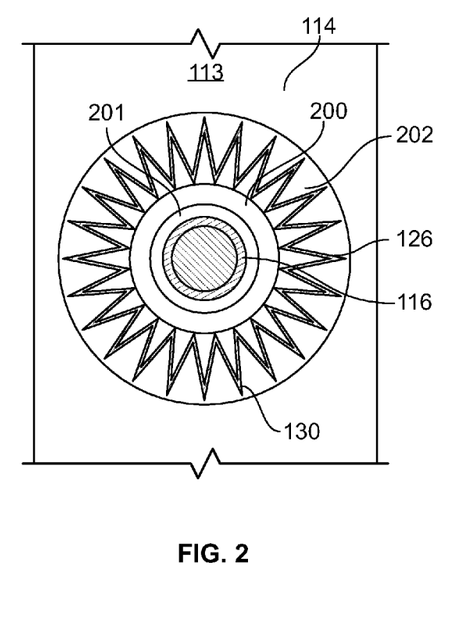
FIG. 2 is a cross-sectional view of an example sleeve and valve shaft of the rotary valve assembly of FIG. 1.

FIG. 2 is a cross-sectional view of the example sleeve 118 and the example shaft 116 along line A-A of FIG. 1. In the illustrated example, the rotary portion 126 is a sheet having the plurality of the longitudinal folds 130. In some examples, the rotary portion 126 is formed by bending the sheet (e.g., circularly) to orient the longitudinal folds 130 to run along the length of the rotary portion 126 (i.e., into the page in the orientation of FIG. 2). The example sleeve 118 defines a space 200 through which the shaft 116 extends through the sleeve 118 and into the valve body 104 via the aperture 201. Thus, the example sleeve 118 contacts the shaft 116 only at the second end 122 of the sleeve 118 where the sleeve 118 and the shaft 116 form a fluid seal. One end of the example rotary portion 126 is coupled to the linear portion 124. An opposing end of the example rotary portion 126 may be coupled to a seat 202 (e.g., a washer) coupled to the flange 114.

Figure 3:
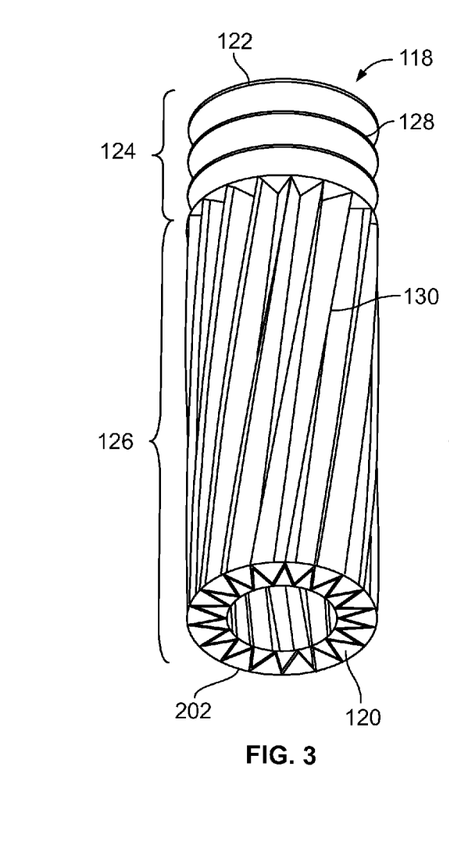
FIG. 3 illustrates an example sleeve of the rotary valve assembly of FIGS. 1-2 in a first position.
Figure 4:
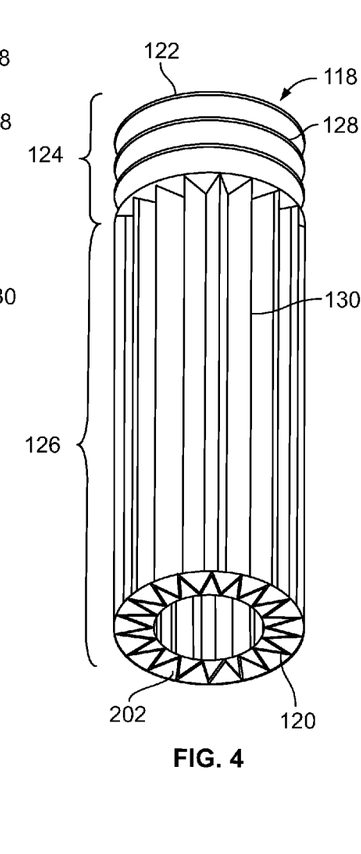
FIG. 4 illustrates the example sleeve of FIGS. 1-3 in a second position.
Figure 5:
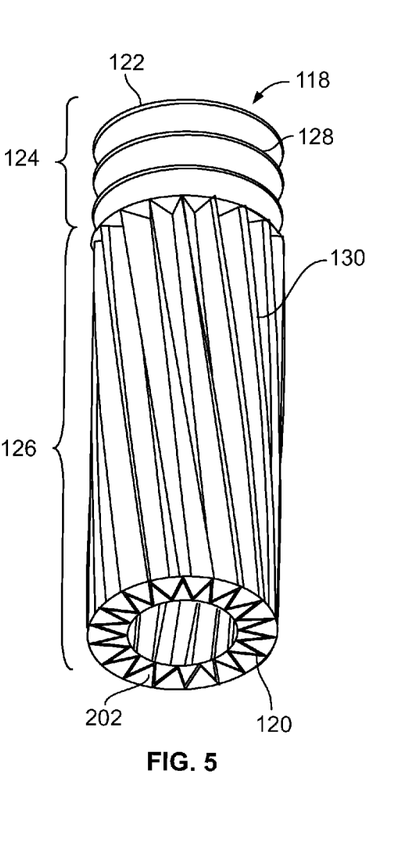
FIG. 5 illustrates the example sleeve of FIGS. 1-4 in a third position.

FIGS. 3-5 illustrate the example sleeve 118 of FIG. 1 in a first position, a second position, and a third position, respectively. The example first position corresponds to a closed position of the flow control member 108 (i.e., a position in which the flow control member 108 substantially prevents fluid flow through the cavity 106). The example second position corresponds to an intermediate position where the flow control member 108 is rotated about forty five degrees from the first position. In the illustrated example of FIG. 4, the second position of the sleeve 118 is an equilibrium position of the sleeve 118 (i.e., a position of the sleeve 118 where the sleeve 118 returns if a force sufficient to deform the sleeve 118 is removed). The example third position corresponds to an open position where the flow control member 108 is rotated about ninety degrees from the first position. Thus, a total travel of the rotary valve 102 (i.e., an amount of rotation of the shaft 116 and, thus, the flow control member 108 from the closed position to the open position or from the open position to the closed position) is about ninety degrees.

When the example rotary valve 102 is in the closed position and the example sleeve 118 is in the first position, the second end 122 of the sleeve 118 is rotated about forty five degrees relative to the first end 120 of the sleeve 118. As a result, the longitudinal folds 130 of the rotary portion 126 form a helical pattern. When the shaft 116 rotates the flow control member 108 from the closed position to the intermediate position, the second end 122 of the sleeve 118 rotates with the shaft 116 and the rotary portion 126 twists. As a result, the length of the example rotary portion 126 increases, and the length of the linear portion 124 decreases. When the example sleeve 118 is in the second position, the first end 120 of the sleeve 118 is substantially not rotated relative to the second end 122 of the sleeve 118. As a result, the longitudinal folds 130 of the rotary portion 126 run substantially parallel to the longitudinal axis of the sleeve 118. Thus, the longitudinal folds 130 of the rotary portion 126 are substantially straight when the example sleeve 118 is in the second position.

When the sleeve 118 is in the third position, the second end 122 of the sleeve 118 is rotated about forty five degrees relative to the first end 120 of the sleeve 118. Thus, while the total travel of the rotary valve 102 is about ninety degrees, the second end 122 of the sleeve 118 is disposed within about forty five degrees of rotation or less relative to the first end 120 of the sleeve 118 throughout the total travel of the rotary valve 102. In other examples, the second end 122 rotates other amounts (e.g., ninety degrees) relative to the first end 120 of the sleeve 118 during operation of the example rotary valve 102. In the illustrated example of FIG. 5, the longitudinal folds 130 of the rotary portion 126 form a helical pattern when the sleeve 118 is in the third position. Thus, the length of the rotary portion 126 decreases and the length of the linear portion 124 increases as the rotary portion 126 twists from the second position to the third position.

Figure 6:
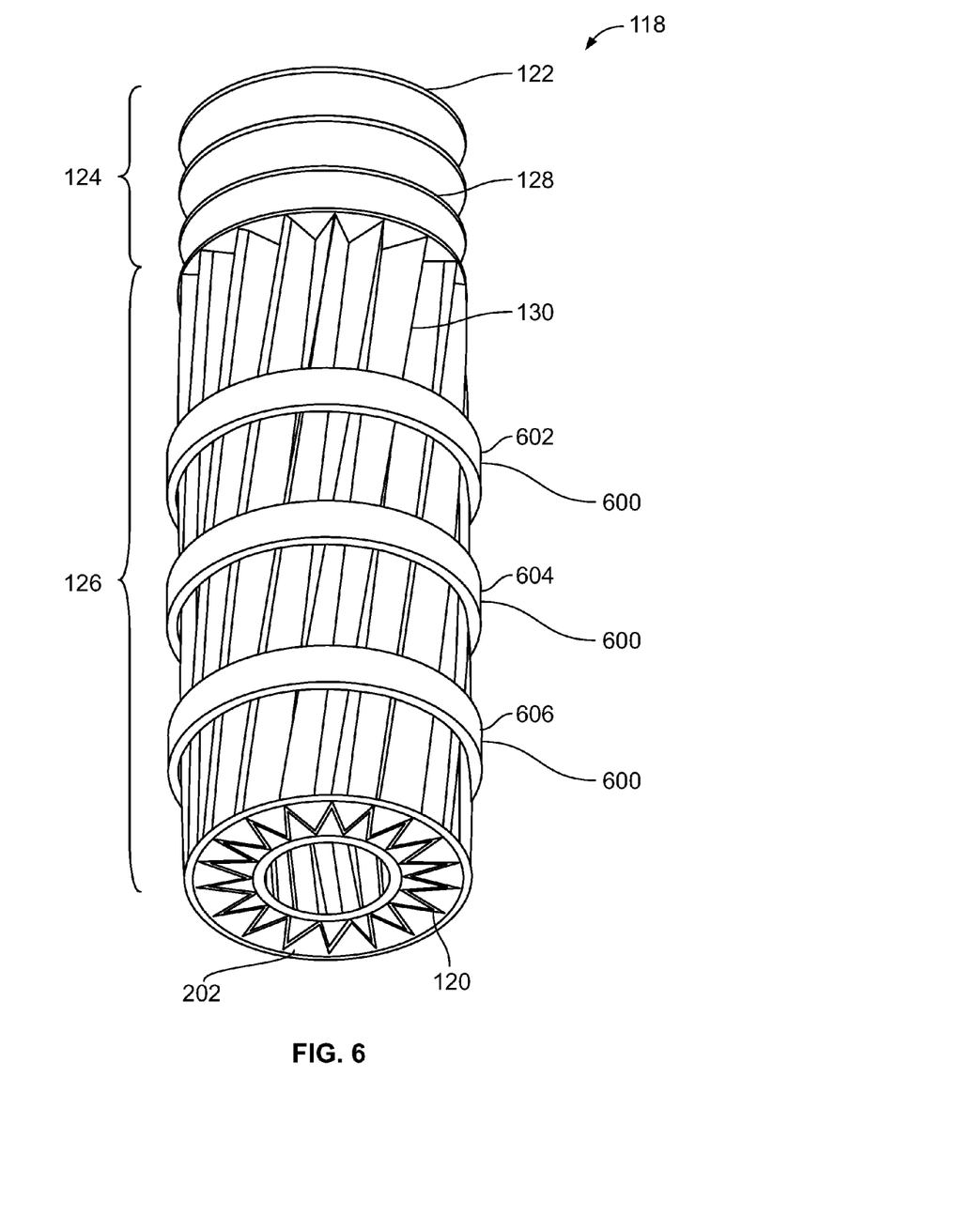
FIG. 6 illustrates the example sleeve of FIG. 1-5 including an example retainer disclosed herein.

FIG. 6 illustrates the example sleeve 118 of FIGS. 1-5 including an example retainer 600. In the illustrated example, the retainer 600 includes a first ring 602, a second ring 604 and a third ring 606 surrounding the rotary portion 126 of the sleeve 118. In other examples, the retainer 600 includes other numbers of rings (e.g., 1, 2, 4, 5, etc.). In the illustrated example, the first ring 602, the second ring 604 and the third ring 606 are spaced apart from each other along the length of the sleeve 118. The example retainer 600 substantially retains a girth of the sleeve 118 (e.g., against pressures of the process fluids) by preventing or limiting radial expansion of the rotary portion 126 of the sleeve 118. In some examples, the retainer 600 is coupled (e.g., press fitted, clearance fitted, etc.) to the sleeve 118 to enable the sleeve 118 to deform (e.g., twist) when the shaft 116 rotates during operation of the example rotary valve 102.

Figure 7:
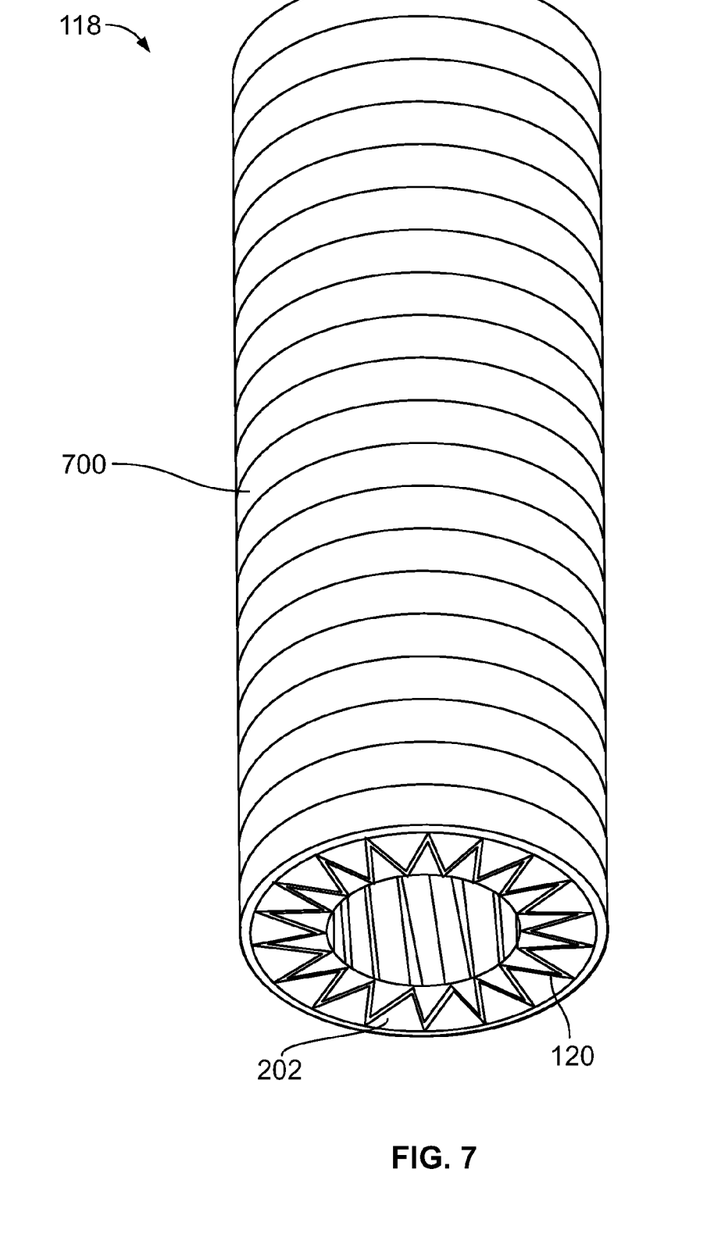
FIG. 7 illustrates another example retainer disclosed herein.

FIG. 7 illustrates another example retainer 700 disclosed herein. In the illustrated example, the retainer 700 is a cylinder surrounding the example sleeve 118. The example retainer 700 substantially prevents the girth of the example sleeve 118 from exceeding an inner diameter of the retainer 700. The example retainer 700 of FIG. 7 has a length substantially similar to the length of the sleeve 118. In other examples, the length of the retainer 700 is different than the length of the sleeve 118. In some examples, the retainer 700 is formed by stacking a plurality of rings from the first end 120 of the sleeve 118 to the second end 122 of the sleeve 118. In other examples, the retainer 700 a single, elongated ring (i.e., a cylinder). In some examples, the retainer 700 is coupled (e.g., press fitted, clearance fitted, etc.) to the sleeve 118 to enable the sleeve 118 to deform (e.g., twist) when the shaft 116 rotates during operation of the example rotary valve 102. The retainer 700 may be coupled to the flange 114 of the bonnet 110.

Figure 8:
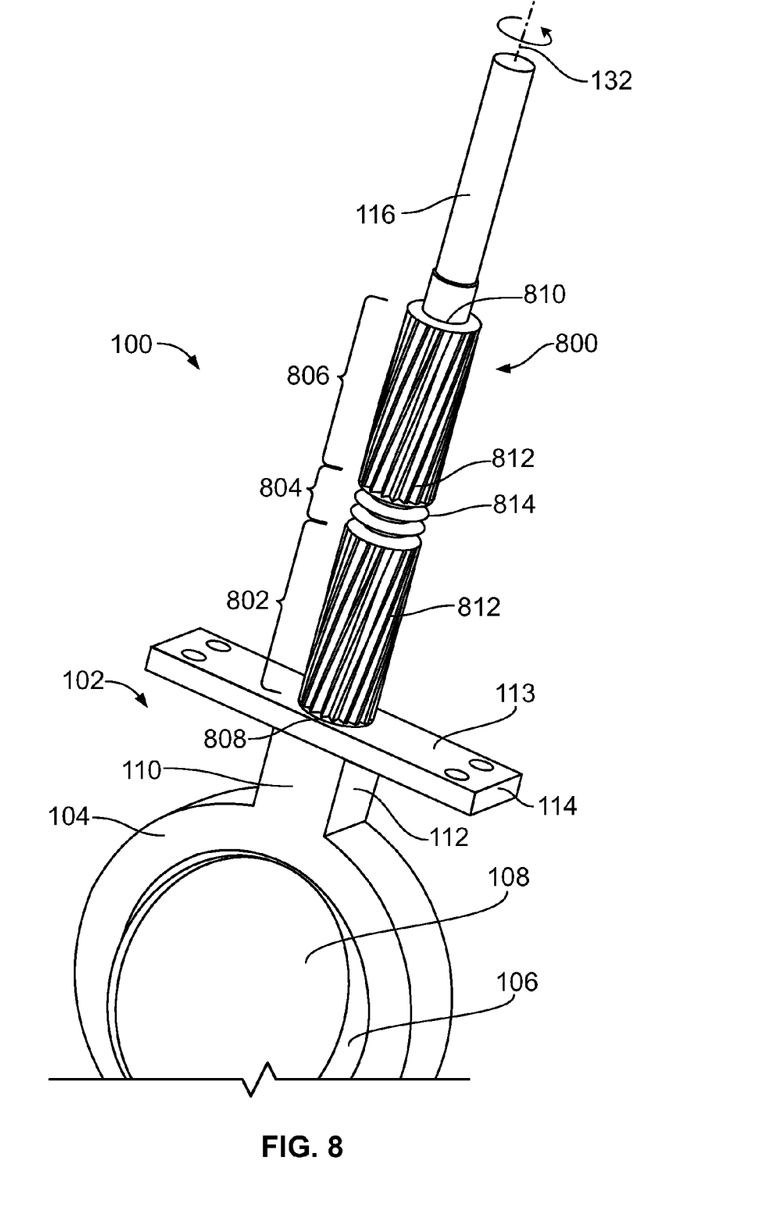
FIG. 8 illustrates another example sleeve disclosed herein.

FIG. 8 illustrates the example valve assembly 100 including another example sleeve 800 disclosed herein. In the illustrated example, the sleeve 800 includes a first rotary portion 802, a first linear portion 804 and a second rotary portion 806. The example first linear portion 804 is disposed between the first rotary portion 802 and the second rotary portion 806. The example sleeve 800 of FIG. 8 is disposed outside of the valve body 104. A first end 808 of the example sleeve 800 (i.e., the first rotary portion 802) is coupled to the flange 114 of the example bonnet 110. In the illustrated example, the first end 808 is coupled to the flange 114 such that the sleeve 800 forms a fluid seal between the sleeve 800 and the flange 114 that surrounds the shaft 116 and the aperture 201 of the valve body 104. A second end 810 (i.e., the second rotary portion 806) of the example sleeve 800 is coupled (e.g., welded, etc.) to the shaft 116. In the illustrated example, the example sleeve 800 is coupled to the shaft 116 such that the sleeve 800 provides a fluid seal around the shaft 116 (e.g., about a circumference of the shaft 116). Thus, the sleeve 800 provides a fluid seal at the first end 808 and the second end 810. As a result, during operation of the example rotary valve 102, process fluids (e.g., liquids, gases, etc.) may substantially fill and/or flow into the cavity 108, the aperture 201 of the valve body 104 and a space between the shaft 116 and the example sleeve 800, and the example sleeve 800 prevents the process fluids from emitting into an ambient environment surrounding the rotary valve 102. Thus, the sleeve 800 does not permit any fugitive emissions via the rotary valve 102.

The first rotary portion 802 and the second rotary portion 806 each include a plurality of longitudinal folds 812 (e.g., corrugations, bellows, ridges, creases, furrows, bends, wrinkles, etc.). In the illustrated example, the longitudinal folds 812 run along a length of the example sleeve 800. In the illustrated example, the longitudinal folds 812 of the first rotary portion 802 and the second rotary portion 806 form a helical pattern because the second end 810 of the sleeve 800 is rotated relative to the first end 808 of the sleeve 800. During operation of the example sleeve 800, the first rotary portion 802 and the second rotary portion 806 elastically deform (e.g., twist) via the longitudinal folds 812 to enable the second end 810 of the sleeve 800 to rotate with the shaft 116 while the first end 808 remains fixed to the flange 114.

The example linear portion includes a plurality of lateral folds 814 (e.g., corrugations, bellows, ridges, creases, furrows, bends, wrinkles, etc.) running or extending around the sleeve 800 (e.g., about a circumference of the sleeve 800). When the first rotary portion 802 and/or the second rotary portion 806 deform (e.g., twist), a first length of the first rotary portion 802 and/or a second length of the second rotary portion 806 changes (e.g., increases or decreases). As a result, the first rotary portion 802 and/or the second rotary portion 806 applies a force to the first linear portion 804, which compresses or expands the first linear portion 804 via the lateral folds 814 (i.e., a third length of the first linear portion 804 increases or decreases). In some examples, the sleeve 800 includes a retainer such as, for example, the example retainer 600 of FIG. 6, the example retainer 700 of FIG. 7, and/or any other retainer in accordance with the teachings of this disclosure.

Figure 9:
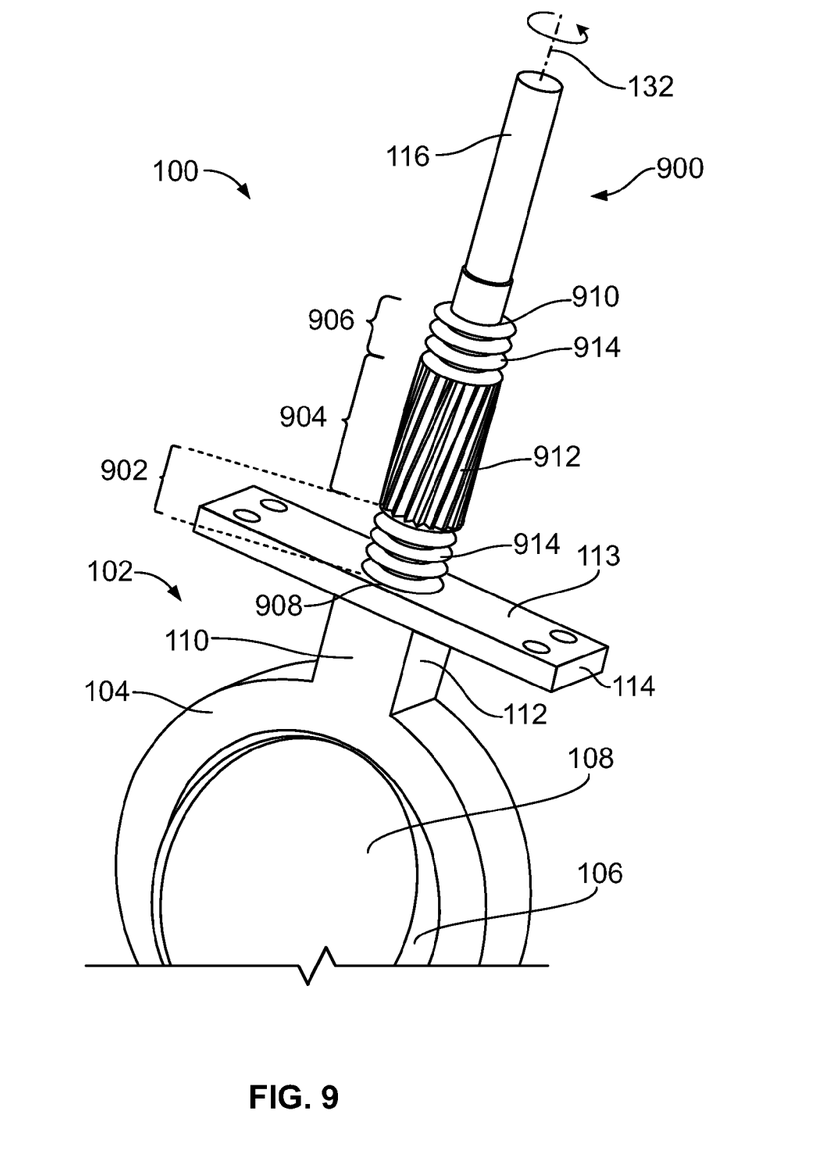
FIG. 9 illustrates yet another example sleeve disclosed herein.

FIG. 9 illustrates the example valve assembly 100 including yet another example sleeve 900 disclosed herein. In the illustrated example, the sleeve 900 includes a first linear portion 902, a rotary portion 904 and a second linear portion 906. In the illustrated example, the rotary portion 904 is disposed between the first linear portion 902 and the second linear portion 906.

The example sleeve 900 of FIG. 9 is disposed outside of the valve body 104. A first end 908 (i.e., the first linear portion 902) of the example sleeve 900 is coupled to the flange 114 of the example bonnet 110. In the illustrated example, the first end 908 is coupled to the flange 114 such that the sleeve 900 forms a fluid seal between the sleeve 900 and the flange 114 that surrounds the shaft 116 and the aperture 201 of the valve body 104. A second end 910 (i.e., the second linear portion 906) of the example sleeve 900 is coupled (e.g., welded, etc.) to the shaft 116. In the illustrated example, the example sleeve 900 is coupled to the shaft 116 such that the sleeve 900 provides a fluid seal around the shaft 116 (e.g., about a circumference of the shaft 116). Thus, the sleeve 900 provides a fluid seal at the first end 908 and the second end 910 of the sleeve 900. As a result, during operation of the example rotary valve 102, process fluids (e.g., liquids, gases, etc.) may substantially fill and/or flow into the aperture 201 and a space between the shaft 116 and the example sleeve 900, and the example sleeve 900 prevents the process fluids from emitting into an ambient environment surrounding the rotary valve 102. Thus, no fugitive emissions escape from the example rotary valve 102 via the sleeve 900.

In the illustrated example, the sleeve 900 is elastically deformable to enable the second end 910 of the sleeve 900 to rotate with the shaft 116 while the first end 908 of the sleeve 900 remains stationary (i.e., fixed to the flange 114). In the illustrated example, the rotary portion 904 of the example sleeve 900 twists when the second end 910 of the sleeve 900 rotates with the shaft 116. As a result, a length of the rotary portion 904 increases or decreases, thereby compressing or expanding the first linear portion 902 and/or the second linear portion 906.

The example rotary portion 904 includes a plurality of longitudinal folds 912 (e.g., corrugations, bellows, ridges, creases, furrows, bends, wrinkles, etc.) running or extending along a length of the sleeve 900 to enable the rotary portion 904 to twist when the shaft 116 rotates. The rotary portion 904 may include any suitable number of longitudinal folds. The example first linear portion 902 and the example second linear portion 906 each include a plurality of lateral folds 914 (e.g., corrugations, bellows, ridges, creases, furrows, bends, wrinkles, etc.) running around the sleeve 900 (e.g., about a circumference of the sleeve 900) to enable the first linear portion 902 and the second linear portion 906 to compress or expand via the lateral folds 914. The example first linear portion 902 and the example second linear portion 906 may include any suitable number of lateral folds. In some examples, the sleeve 900 includes a retainer such as, for example, the example retainer 600 of FIG. 6, the example retainer 700 of FIG. 7, and/or any other suitable retainer in accordance with the teachings of this disclosure.

Figure 10:
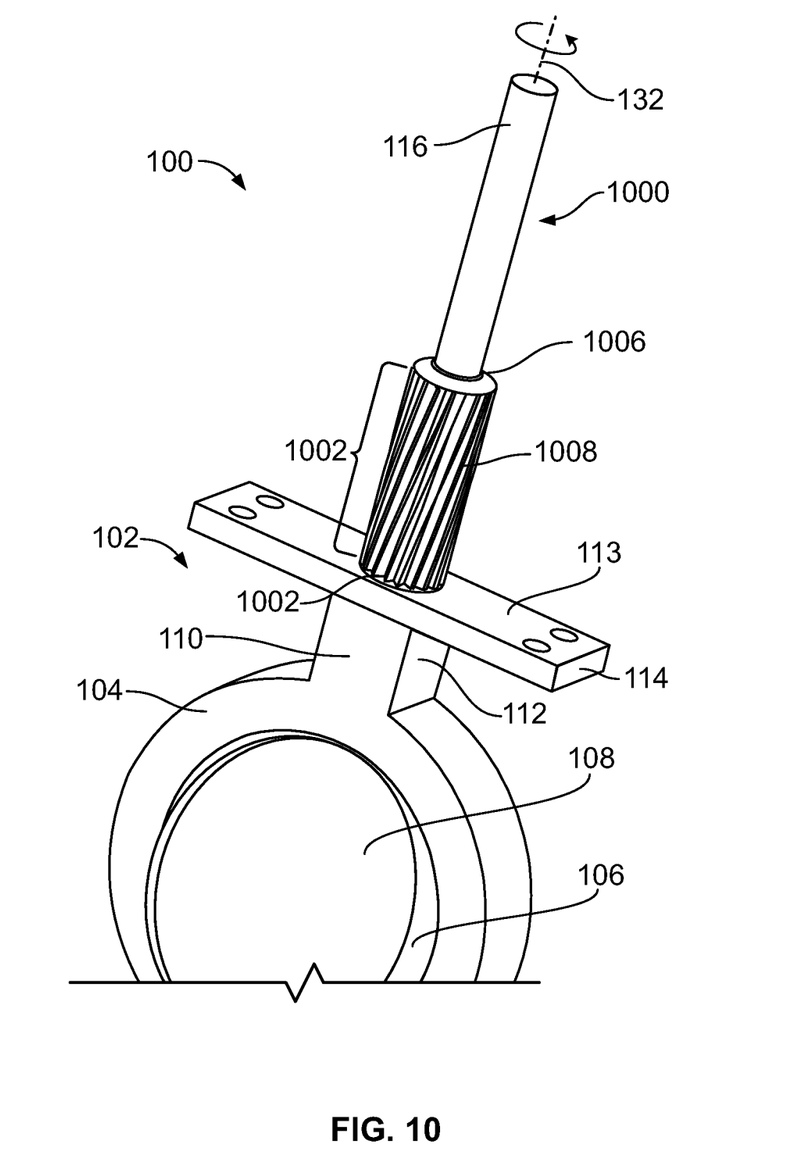
FIG. 10 illustrates another example sleeve disclosed herein.

FIG. 10 illustrates the example valve assembly 100 including another example sleeve 1000 disclosed herein. In the illustrated example, the sleeve 1000 includes a rotary portion 1002. The example sleeve 1000 of FIG. 10 is disposed outside of the valve body 104. A first end 1004 of the example sleeve 1000 is coupled to the flange 114 of the example bonnet 110. In the illustrated example, the first end 1004 is coupled to the flange 114 such that the sleeve 1000 forms a fluid seal between the sleeve 1000 and the flange 114 that surrounds the shaft 116 and the aperture 201 of the valve body 104. A second end 1006 of the example sleeve 1000 is coupled (e.g., welded, etc.) to the shaft 116. In the illustrated example, the example sleeve 1000 is coupled to the shaft 116 such that the sleeve 1000 provides a fluid seal around the shaft 116 (e.g., about a circumference of the shaft 116). Thus, the sleeve 1000 provides a fluid seal at the first end 1004 and the second end 1006 of the sleeve 1000. As a result, during operation of the example rotary valve 102, process fluids (e.g., liquids, gases, etc.) may substantially fill and/or flow into the aperture 201 and a space between the shaft 116 and the example sleeve 1000, and the example sleeve 1000 prevents the process fluids from emitting into an ambient environment surrounding the rotary valve 102. Thus, no fugitive emissions escape from the example rotary valve 102 via the sleeve 1000.

In the illustrated example, the sleeve 1000 is elastically deformable to enable the second end 1006 of the sleeve 1000 to rotate with the shaft 116 while the first end 1004 of the sleeve 1000 remains stationary (i.e., fixed to the flange 114). In the illustrated example, the rotary portion 1002 of the example sleeve 1000 twists when the second end 1006 of the sleeve 1000 rotates with the shaft 116. The example rotary portion 1002 includes a plurality of longitudinal folds 1008 (e.g., corrugations, bellows, ridges, creases, furrows, bends, wrinkles, etc.) running along a length of the sleeve 1000 to enable the rotary portion 1002 to twist when the shaft 116 rotates. The rotary portion 1002 may include any suitable number of longitudinal folds. In some examples, the sleeve 1000 includes a retainer such as, for example, the example retainer 600 of FIG. 6, the example retainer 700 of FIG. 7, and/or any other retainer in accordance with the teachings of this disclosure.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:
1. An apparatus, comprising:
a valve body;
a shaft extending into the valve body, the shaft to rotate relative to the valve body; and a seal disposed outside of the valve body to provide a fluid seal between the shaft and a cavity within the valve body, the seal having a first portion fixedly coupled to the valve body and a second portion fixedly coupled the shaft to enable the first portion of the seal to rotate relative to the second portion of the seal when the shaft is rotated about a longitudinal axis of the shaft, the seal having:

a first rotary portion having a first edge and a second edge defining a first longitudinal length of the first rotary portion, the first rotary portion having a plurality of longitudinal folds, the longitudinal folds each defining a body that extends between the first edge and the second edge such that a first end of the body is defined by the first edge and a second end of the body is defined by the second edge;

a linear portion adjacent the rotary portion, the linear portion having a lateral fold extending around a circumference the seal such that the lateral fold is substantially perpendicular to the longitudinal axis of the shaft; and a second rotary portion that includes longitudinal folds that extend between a third edge of the second rotary portion and a fourth edge of the second rotary portion, the third and fourth edges defining a second longitudinal length of the second rotary portion, the linear portion being disposed between the first and second rotary portions.

2. The apparatus of claim 1, wherein the first portion of the seal is coupled to an exterior surface of the valve body.

3. The apparatus of claim 1, wherein rotation of the shaft relative to the valve body is to rotate the first portion of the seal relative to the second portion of the seal.

4. The apparatus of claim 1, wherein the longitudinal folds of at least one of the first rotary portion or the second rotary portion are to form a helical pattern when the shaft is rotated in a first direction about the longitudinal axis of the shaft between a first position and a second position.

5. The apparatus of claim 1 further comprising a retainer surrounding at least a portion of the seal to substantially prevent girth of the seal from exceeding an inner diameter of the retainer, wherein the retainer comprises a ring.

6. An apparatus, comprising:

a sleeve having a first portion to be coupled to a valve body and a second portion to be coupled to a shaft extending into the valve body, the sleeve to provide a fluid seal between the shaft and an inner portion of the valve body, the first portion of the sleeve to rotate relative to the second portion of the sleeve about a longitudinal axis of the sleeve between a first position, a second position, and a third position, the sleeve including:

a first corrugated portion to enable the sleeve to elastically deform about the longitudinal axis of the sleeve when the first portion of the sleeve rotates relative to the second portion of the sleeve between the first, second and third positions, the first corrugated portion having a first longitudinal length defined by a first edge and a second edge, the first corrugated portion having a first longitudinal fold extending in a direction of the longitudinal axis of the sleeve such that a first end of the first longitudinal fold is adjacent the first edge of the first corrugated portion and a second end of the first longitudinal fold is adjacent the second edge of the first corrugated portion, the first longitudinal fold to twist relative to the longitudinal axis of the sleeve when the sleeve is in the first and third positions, and the first longitudinal fold to be substantially parallel relative to the longitudinal axis when the sleeve is in the second position;

a second corrugated portion, a length of the second corrugated portion to at least one of increase or decrease when the first corrugated portion elastically deforms, the second corrugated portion including a lateral fold; and a third corrugated portion to elastically deform about the longitudinal axis when the first portion of the sleeve rotates relative to the second portion of the sleeve, the second corrugated portion being disposed between the first corrugated portion and the third corrugated portion, the first corrugated portion defines the first portion of the sleeve and the third corrugated portion defines the second portion of the sleeve, the third corrugated portion having a second longitudinal length defined by a third edge and a fourth edge, the third corrugated portion having a second longitudinal fold extending in a direction of the longitudinal axis of the sleeve such that a third end of the second longitudinal fold is adjacent the third edge of the third corrugated portion and a fourth end of the second longitudinal fold is adjacent the fourth edge of the third corrugated portion, the second longitudinal fold to twist relative to the longitudinal axis of the sleeve when the sleeve is in the first and third positions, and the second longitudinal fold to be substantially parallel relative to the longitudinal axis when the sleeve is in the second position.

7. The apparatus of claim 6 further comprising a retainer surrounding at least a portion of the sleeve, the retainer to substantially prevent girth of the sleeve from exceeding an inner diameter of the retainer.

8. The apparatus of claim 6, wherein at least one of the first longitudinal fold or the second longitudinal fold comprises a plurality of folds.

9. An apparatus, comprising:

a seal through which a rotary shaft is to extend, a first end of the seal to rotate with the shaft and relative to a second end of the seal between a first position and a second position, the seal having:

a first rotary portion defining the first end of the seal, the first rotary portion of the seal including a first plurality of longitudinal folds defining a first body that extends in a longitudinal direction between a first edge of the first rotary portion and a second edge of the first rotary portion, the first and second edges defining a first length of the first rotary portion, the first longitudinal folds being substantially straight or parallel relative to a longitudinal axis of the seal when the seal is rotated to at least a third position between the first and second positions;

a second rotary portion defining the second end of the seal, the second rotary portion of the seal including a second plurality of longitudinal folds defining a second body that extends in a longitudinal direction between a third edge of the second rotary portion and a fourth edge of the second rotary portion, the third and fourth edges defining a second length of the second rotary portion, the second longitudinal folds being substantially straight or parallel relative to the longitudinal axis of the seal when the seal is rotated to at least a fourth position between the first and second positions; and a linear portion positioned between the first and second rotary portions, the linear portion having a plurality of lateral folds extending around the seal, wherein rotation of the shaft is to twist at least one of the first rotary portion or the second rotary portion of the seal and at least one of compress or expand the linear portion of the seal.

10. The apparatus of claim 9, wherein the second end of the seal is to couple to an exterior surface of a valve body.

11. The apparatus of claim 10, wherein the seal surrounds a portion of the shaft disposed outside of the valve body.

12. The apparatus of claim 9 further comprising a retainer surrounding at least a portion of the seal to restrict girth of the seal from exceeding an inner diameter of the retainer, wherein the retainer comprises a ring.

13. The apparatus of claim 9, wherein at least one of the first longitudinal folds or the second longitudinal folds are to form a helical pattern when the first end of the seal is rotated relative to the second end of the seal.

14. The apparatus of claim 4, wherein the longitudinal folds of the at least one of the first rotary portion or the second rotary portion extend substantially parallel relative to the longitudinal axis of the shaft when the shaft is in an intermediate position, the intermediate position being between the first and second positions.

\* \* \* \* \*